United States Patent [19]
Laney

[11] 3,772,512
[45] Nov. 13, 1973

[54] LIQUID SCINTILLATION COINCIDENCE DETECTOR
[75] Inventor: Barton H. Laney, Deerfield, Ill.
[73] Assignee: G. D. Searle & Co., Chicago, Ill.
[22] Filed: July 2, 1971
[21] Appl. No.: 159,389

[52] U.S. Cl. .................................... 250/366
[51] Int. Cl. ............................... G01t 1/20
[58] Field of Search ............. 250/71.5 R, 106 SC

[56] References Cited
UNITED STATES PATENTS
3,610,928  10/1971  Thomas ................. 250/106 SC
3,634,688  1/1972   Di Rocco ............... 250/71.5 R

*Primary Examiner*—Archie R. Borchelt
*Attorney*—Lowell C. Bergstedt et al.

[57] ABSTRACT

An improved liquid scintillation coincidence detector. Means are provided for determining the number of accidentally coincident electrical discharges, on a statistical basis, in the photodetectors in a liquid scintillation detector. These accidentally coincident discharges largely result from the phosphorescent qualities of the samples measured in the liquid scintillation counter. When accidental coincidences exceed an upper limit, which is dependent upon the rate of occurrence of total coincidences, the coincidence counter is disabled.

9 Claims, 7 Drawing Figures

INVENTOR.
BARTON H. LANEY

INVENTOR.
BARTON H. LANEY

BY
ATTY. Charles H. Thomas Jr.

LIQUID SCINTILLATION COINCIDENCE DETECTOR

This invention relates to an improved liquid scintillation coincidence detector. More particularly, means are provided for determining, on a statistical basis, the number of accidentally coincident electrical discharges occurring in the photodetectors in the liquid scintillation device. These accidentally coincident discharges largely result from phosphorescence of the scintillation liquid in the liquid sample.

In a liquid scintillation coincidence detection device spontaneous or spurious discharges in a photodetector will not produce a recorded scintillation count. This is because no counts are registered unless at least two photodetectors emit electrical discharges within the system resolving time. It is usually the case that such discharges result from a scintillation in the liquid sample produced by a radio active event. Isolated spurious discharges of the individual photodetectors are not registered since such dischazges are not normally coincident.

With the increased requirement for accuracy in scintillation detection, and with the broadened use of low activity samples in coincidence detection devices, however, a more pressing need has arisen for compensating for the spurious discharges from the photodetectors which happen to coincide in time and which therefore are recorded. Because these discharges coincide in time only on a random basis, such coincidences will hereinafter be referred to as "accidentally coincident discharges."

It is an object of this invention to provide a liquid scintillation coincidence counting device which is able to tabulate scintillations relatively free from errors introduced by accidentally coincident discharges. These errors may be negated either by insuring that no more than a maximum percentage of the scintillations recorded are attributable to accidentally coincident discharges, or by deducting from the scintillation count the number of counts which are attributable to the coincidence in time of spurious, random electrical pulses.

Moreover, it is an object of the invention to determine the number of accidentally coincident discharges occurring in a liquid scintillation system and to compensate or regulate these discharges. This determination of accidentally coincident discharges is performed on a statistical basis. That is, while it is impractical to attempt to identify specific coincident pulses as attributable either to scintillations or to spurious discharges, it is entirely practical and desirable to determine on the basis of probability the number of recorded coincidences which do not represent true scintillations but which only represent phosphorescence in the liquid sample or spurious discharges from at least two individual photodetecting devices which happen to coincide in time.

In one embodiment of the invention, it is an object of the invention to disable the coincidence counter when the improved liquid scintillation detector indicates an inordinately large number of accidentally coincident discharges occurring in the photodetectors.

In an alternative form of the invention, it is an object to correct the total count in the scintillation counter by deducting from the total coincidence count the number of accidentally coincident discharges in the photodetectors not representing the occurrence of valid radioactive events.

Accordingly, in one broad aspect this invention is, in a liquid scintillation coincidence detection device utilizing a coincidence counter in a plurality of photodetectors in combinations of two, the improvement comprising means for determining the number of accidentally coincident discharges from said photodetectors on a statistical basis and means for deducting the number of accidentally coincident discharges from the total number of coincident discharges recorded in the coincidence counter.

In an alternative embodiment, the invention is in a liquid scintillation coincidence detection device utilizing a coincidence counter and a plurality of photodetectors connected in combinations of two, the improvement comprising: means for determining the number of accidentally coincident discharges from the photodetectors on a statistical basis; means for determining the number of total actual coincident discharges from the photodetectors; means for determining an allowable limit of accidentally coincident discharges; and means for preventing recordation of coincident discharges in the coincidence counter when the number of accidentally discharges exceeds the allowable limit.

As a modification to this latter form of the invention, the rate of occurrence of anticoincident discharges may be determined as a percentage of the rate of coincident discharges. A means for comparing this percentage to a percentage limit is provided, and a means is also provided for preventing recordation of coincident discharges in the coincidence counter when the aforesaid percentage exceeds the percentage limit. Anticoincident discharges may be used as a parameter in place of the number of accidentally coincident discharges. Anticoincident discharges are all the discharges from one photodetector minus those discharges which are coincident with discharges from another photodetector. These anticoincident, or single discharges, are directly determinative of the number of accidentally coincident discharges, since the number of accidentally coincident discharges is a function of the rate of occurrence and duration of anticoincident discharges. More particularly, the number of accidentally coincident discharges may be determined from the formula $$A = 2S_1 S x h d\ 2t$$

where A is the number of accidentally coincident discharges, $S_1$ is the number of anticoincident discharges from a first photodetector, $S_2$ is the number of anticoincident discharges from a second photodetector, and t is the resolving time of the electronic logic circuitry.

It follows that the percentage of error in the number of scintillations recorded is at least as great as the ratio A:C multiplied by 100 percent, where C is the recorded number of coincident discharges. If the photodetectors are symmetrical so that $S_1 = S_2$, and if a maximum percentage of error for the system has been predetermined, then the allowable count rate of anticoincident discharges may be determined from the formula:

$$S \leq \sqrt{K \times C/200t}$$

As a corollary, the allowable number of accidental coincidences is less than or equal to $K \times C/100$. $K$ in all cases is a constant.

The explanation of the operation and the details of the construction of this invention are more clearly illustrated by reference to the accompanying drawings in which.

Figure 1:
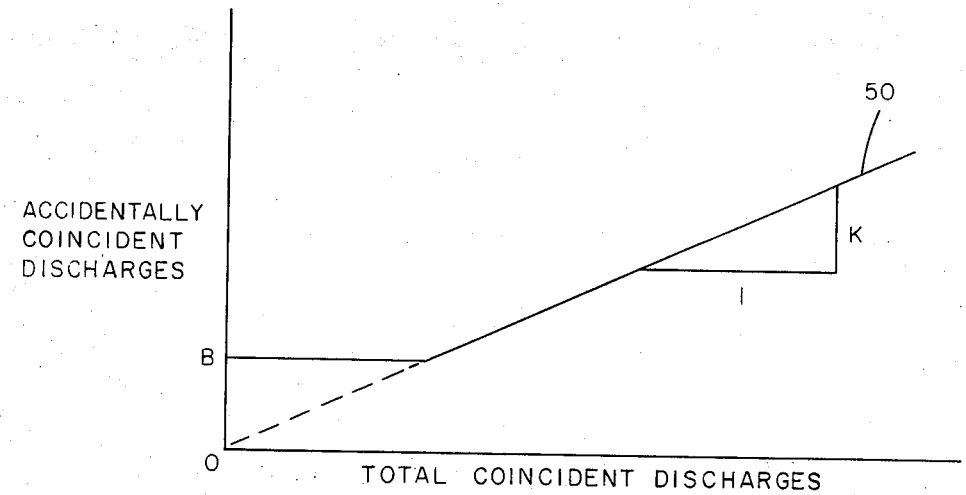
FIG. 1 illustrates the relationship between allowable accidentally coincident discharges and total coincident discharges.

Referring now to FIG. 1, line 50 illustrates the relationship between the number of allowable accidentally coincident discharges and the number of total coincident discharges. FIG. 1 graphically illustrates the relationship:

$$A \leq K \times C.$$

It should be noted that for samples of extremely low activity, there must be a minimum allowable level of accidentally coincident discharges. This minimum allowable level is depicted at B in FIG. 1. For the sake of clarity, the vertical scale of accidentally coincident discharges is expanded with respect to the horizontal scale of total coincident discharges in FIG. 1. The allowable percentage of accidentally coincident discharges will normally be less thav 10%.

Figure 7:
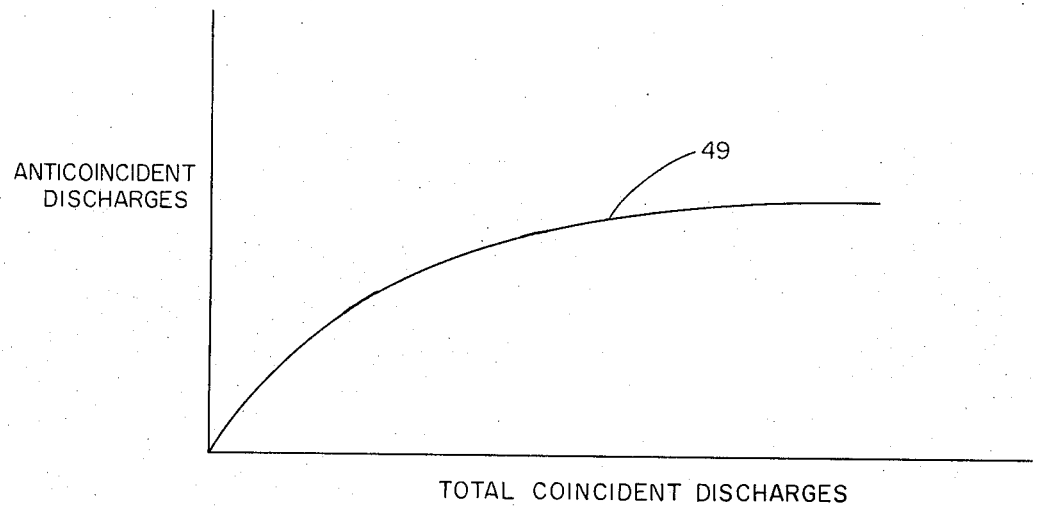
FIG. 7 illustrates the relationship between allowable anticoincident discharges and total coincident discharges.

FIG. 7 depicts the relationship between allowable anticoincident discharges and total coincident discharges. The percentage limit of anticoincident discharges is a root function of total coincident discharges as depicted by the curve 49 which conforms to the formula:

$$S \leq \sqrt{K \times C/200t}$$

While an approximation of curve 49 could be used to define the allowable number of anticoincident discharges, a more preferred arrangement is a circuit which produces a function that conforms to FIG. 1 as well as FIG. 7.

Figure 2:
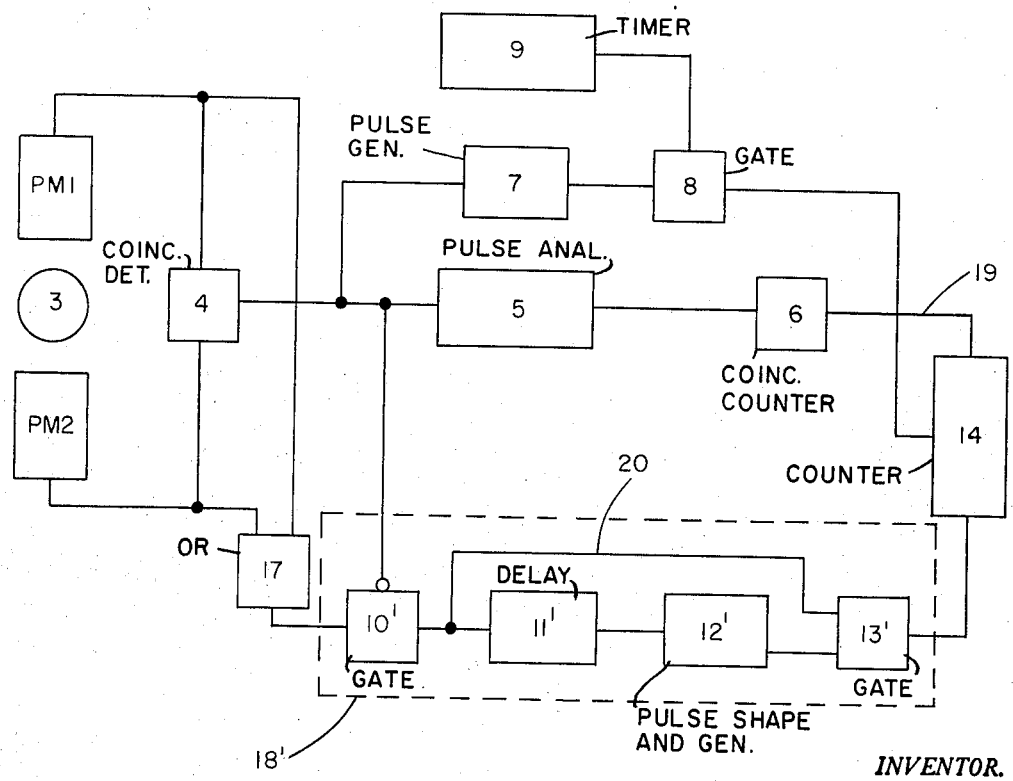
FIG. 2 is a block diagram of one embodiment of the invention.

Such a system is illustrated in FIG. 2 in which photomultipliers PM1 and PM2 are in optical communication with a scintillation chamber 3. A conventional coincidence counting system is employed and is comprised of a coincidence detector 4 connected to photomultipliers PM1 and PM2 and providing an input to pulse height analysis means 5, the output of which is registered in coincidence counter 6. The novel portion of the present invention resides in the equipment used to limit or remove errors in coincidence counting due to accidentially coincident discharges from PM1 and PM2. Because the means 18' for determining the number of accidentally coincident discharges from the photodetectors in FIG. 2 is merely a simplified form of the similar means 18 in FIG. 5, FIGS. 2 and 5 will be discussed together.

Figure 5:
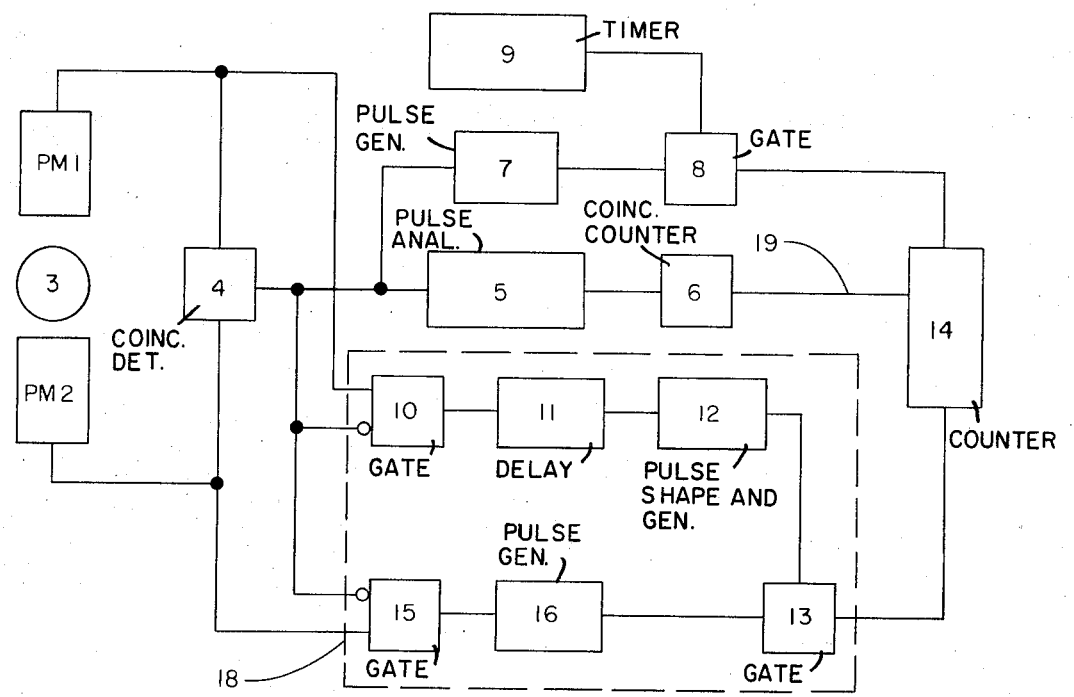
FIG. 5 is a yet another alternative embodiment of the invention.

In FIG. 5, the gating means 10 is connected to PM1 and coincidence detector 4. The input to gating means 10 from coincidence detector 4 is inverted, so that absence of coincident pulses from PM1 and PM2 is necessary, along with a discharge of PM1, to effectuate an output by gating means 10. Accordingly, an output from gating means 10 exists during the time that an anticoincident pulse is received from PM1. In other words, there is an output from gating means 10 whenever there is an input from PM1 without a coincident discharge from PM2. Conversely, there is an output from gating means 15 only when PM2 discharges and PM1 does not. A delay means 11 introduces a delay into the output of gating means 10 and a pulse shaping and generating means 12 passes a delayed pulse to gating means 13. Delay means 11 is necessary in order to shift the output signals of gating means 10 in time so that accidental coincidences can be separated from true coincidences. Similarly, a pulse shaping and generating means 16 passes undelayed pulses from gating means 15. Outputs from both of the pulse generating means 12 and 16 are required in order to produce an output from gating means 13. Accordingly, the probability of an output from gating means 13 is equal to the probability of an anticoincident or single pulse from PM1 times the probability of an anticoincident or single pulse from PM2 times the sum of two coefficients. These coefficients are directly related to the durations of the pulses generated by pulse generating means 12 and 16, since the lengths of these pulses directly affect the total probability that a subsequent pulse from PM2 will coincide in time with a prior pulse from PM1 which was delayed by pulse delay means 11. Since the probability of coincidence of a pulse from PM2 and a delayed pulse from PM1 is random, this resultant probability is statistically equivalent to the number of random, spurious, or accidental, pulses which are detected as coincident by coincidence detector 4. Of course the duration of the pulses, as determined by pulse generating means 12 and 16, creates a linear relationship between the probability of an output from gating means 13 and the percentage of accidentally coincident pulses as detected by a coincidence detector 4.

The circuit of FIG. 2 differs from that of FIG. 5 only in that the rate and duration of anticoincident pulses from PM1 are presummed to be equal to the rate and duration of anticoincident pulses from PM2. Accordingly, the pulses from PM1 and PM2 are added in the OR-ing means or totalizer 17 and transmitted to gating means 10'. Gating means 10' produces an output only in the absence of coincident pulses from coincidence detector 4. A pulse is transmitted by circuit 20 as an input to gating means 13'. The same pulse is delayed by pulse delay means 11' and reshaped by pulse generator 12'. An output is produced by gating means 13' only if a subsequent anticoincident pulse is received by gating means 13' from circuit 20 coincident in time with a prior pulse delayed by pulse delay means 11'. As explained, the origin of either of the inputs to gating means 13' as between PM1 and PM2 is indeterminable, and an output from gating means 13' may be treated in a useful manner only if the pulse generating characteristics of PM1 and PM2 are identical.

Both in the embodiment of FIG. 2 and in that of FIG. 5, an output of gating means 13' or 13 representing accidentially coincident discharages from PM1 and PM2 is passed to a four bit binary up-down counter 14. Counter 14 also receives inputs from alternative gating means 8. Gating means 8 transmits signals to counter 14 both from coincidence detector 4, as reshaped by pulse generator 7, and from background timer 9. Accordingly, the background timer 9 transmits periodic pulses to counter 14 corresponding to a minimum allowable accidentally coincident discharge rate B, as illustrated in FIG. 1. The transmission of pulses to counter 14 from coincidence detector 4 insures a relationship between accidental and total coincident discharges corresponding to the line 50 in FIG. 1. The slope K in FIG. 1 may be achieved by proper adjustment of the duration of pulses by adjusting pulse generating means 12 and 16 or pulse generating means 12'. As long as a sufficient number of pulses are received by counter 14 from gating means 8, the recordation of coincident discharges by coincidence counter 6 is unhampered. If the number of accidental pulses as evidenced by the signals from gating means 13 or 13', is excessive, a disabling signal is passed on circuit 19 to coincidence counter 6 so that further tabulation of coincident discharges is discontinued, at least temporarily.

Figure 4:
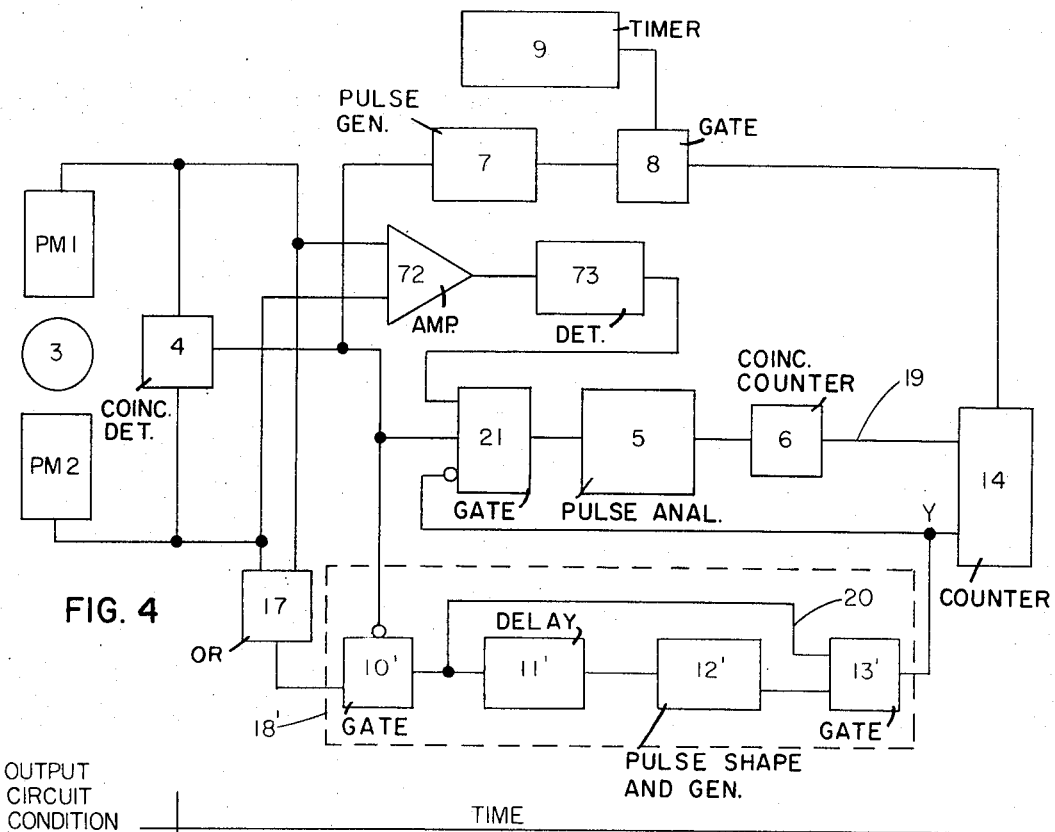
FIG. 4 is another embodiment of the invention alternative to that of FIG. 2.

An alternative arrangement is illustrated in FIG. 4 in which an additional gating mechanism 21 is incorporated into the liquid scintillation detection system. The gating mechanism 21 receives input pulses from coincidence detector 4, threshold discriminator 73 and gating means 13', and passes a signal only when coincidence detector 4 passes a coincidence signal and when either one of two gating conditions exist. These gating conditions are created either when the gating means 21 has not been blocked by the registration of an accidental pulse from gating means 13' or when the threshold level of discriminator 73 has been exceeded.

The amplifier 72 and the threshold detector 73 are conventional devices and are utilized to insure that gating mechanism 21 does not block pulses from coincidence detector 4 unless the coincident pulses from PM1 and PM2 together are below a maximum pulse amplitude sum. This prevents pulses from being blocked which are not of a pulse amplitude at which accidental coincidences would occur. Each time a signal representing an accidental coincidence is generated by gating means 13', it is passed by a connection from Y at the output of gating means 13' to gating mechanism 21. This creates a blocking condition in gating means 21 which is maintained until a pulse is received from coincidence detector 4, but not from threshold discriminator 73, at which time the signal from detector 4 is blocked, whereupon the blocking condition in gating mechanism 21 is removed. In this manner a subtraction of accidental coincident pulses is made from the pulses which are to be registered in coincidence counter 6. As in the other embodiments, a disabling signal is passed to counter 6 from counter 14 when the number of accidental pulses generated by gating means 13' exceeds a maximum limit. Adjustment of the system to insure unity in the relationship between the number of counts subtracted and the number of accidentally coincident discharges determined on a statistical basis, may be effected by adjustment of the duration of pulses generated by pulse generating means 12' or by insertion of a voltage dividing means between the voltage tap at Y and gating mechanism 21 or in the gating mechanism 21 itself.

Figure 3:
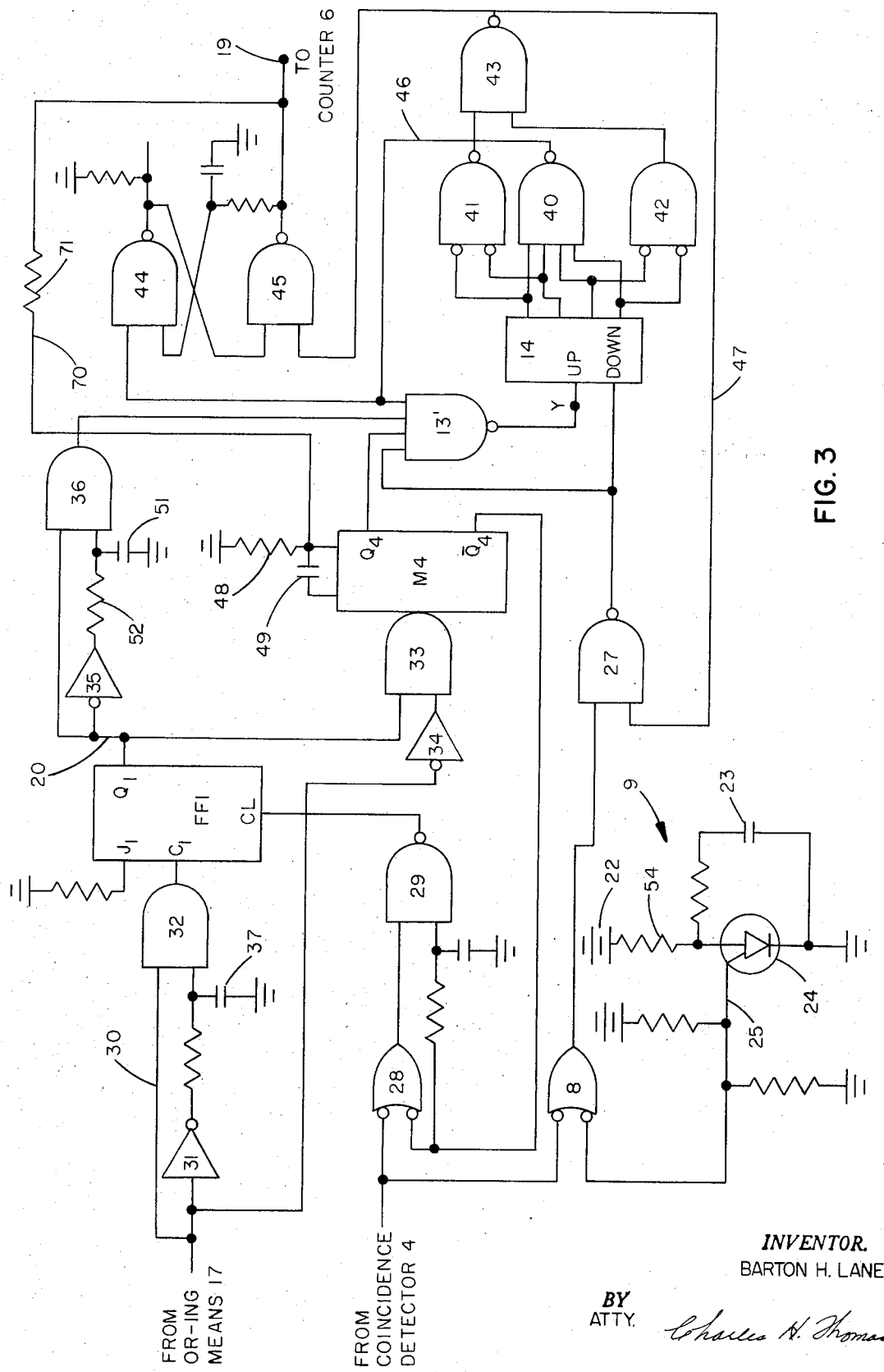
FIG. 3 is a schematic diagram of a portion of FIG. 2.
Figure 6:
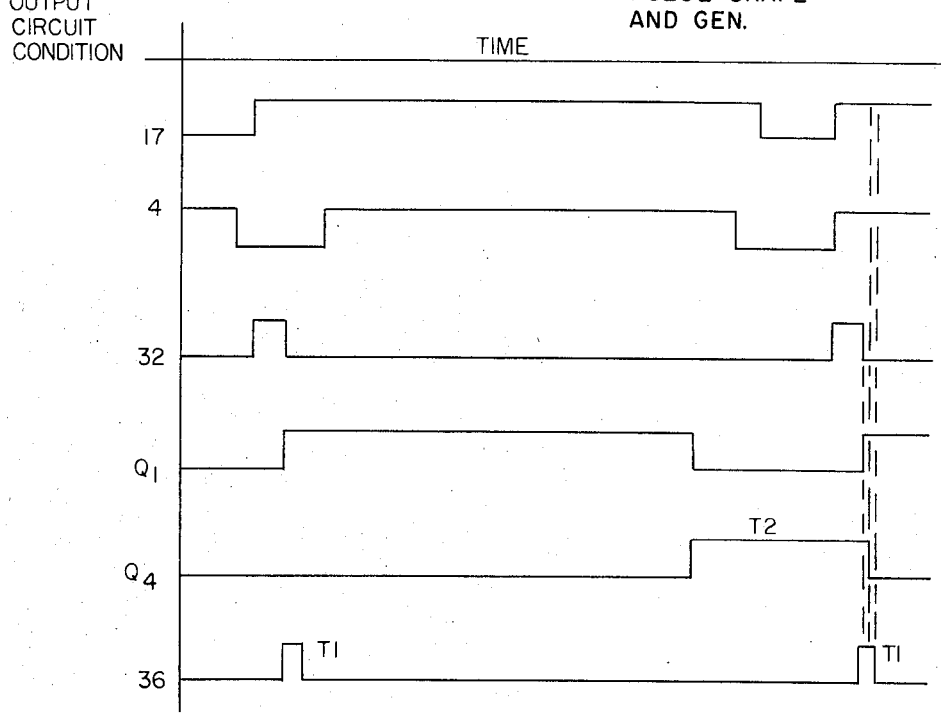
FIG. 6 is a timing diagram illustrative of circuit conditions at points in FIG. 3.

The electronic circuitry in the means 18' in FIG. 2 for determining the number of accidentally coincident discharges from the photodetectors and the circuitry surrounding the counter 14 are illustrated in detail in FIG. 3. Referring now to FIGS. 2, 3, and 6, the circuit conditions may be traced in controlling the number of accidentally coincident discharges recorded in coincidence counter 6 or 6'. A pulse eminating from OR-ing means 17 is received by inverter 31, inverter 34, and AND gate 32. The pulse from OR-ing means 17 preferably is of a duration that includes the entire resolving time of the pulse height analysis circuitry in the liquid scintillation counter. This is commonly referred to as "dead time" and is the order of 4 microseconds. The pulses from OR-ing means 17 occur whenever there is an electrical discharge in PM1 or in PM2, or coincident electrical discharges in both PM1 and PM2. When coincident discharges do occur, there is also an input to OR Gate 28 from coincidence detector 4. The pulse from coincidence detector 4 is normally generated faster than the pulse from summing means 17, and therefore begins slightly in advance of the pulse from OR-ing means 17, as illustrated in FIG. 6. When a coincidence is detected by coincidence detector 4, a pulse is inverted and passed through OR Gate 28 and AND Gate 29. There is an output from AND Gate 29 when the monostable multivibrator M4 is in its normal condition with a 0 output from $Q_4$ and a 1 output from $\bar{Q}_4$. The multivibrator M4 is in its normal condition unless the means 18' for determining the number of accidentally coincident discharges is currently processing previously initiated pulses. In the case of a true scintillation and the registration of a coincidence at coincidence counter 4, AND Gate 29 passes an inverted signal to lead CL of the flip-flop circuit FF1. This signal is again inverted at FF1 and disables the flip-flop circuit FF1 and prevents the appearance of an output at lead $Q_1$.

The pulse from OR-ing means 17 is inverted at inverter 31. A delay is introduced by the pulse delay means which is comprised of the AND Gate 32 having one input connected by lead 30 to the output of OR-ing means 17 and the other input connected through a resistor and through the inverting amplifier 31. This input is grounded through capacitor 37. When a pulse or discharge is released from inverter 31, it is inverted and delays the gating placed on one of the input leads to AND Gate 32 by capacitor 37. Since the other input lead to AND Gate 32 is charged by OR-ing means 17, a short pulse is produced as an output from AND Gate 32 and an input to lead $C_1$ of flip-flop FF1. The trailing edge of this output from AND Gate 32 initiates a discharge condition in FF1. If no disabling signal has been received at lead CL due to a detected coincidence, there will be an output signal at lead $Q_1$. This output signal from lead $Q_1$ provides an input to the delayed pulse generating means comprised of inverter 34, AND Gate input 33, and monostable multivibrator M4. In addition, the output from $Q_1$ bypasses the delayed pulse generating means through circ uit 20. In circuit 20 the pulse is inverted, and delayed to AND Gate 36 by resistor 52 and capacitor 51. The output from AND Gate 36 is a short pulse T1. The duration of pulse T1 may be governed by the value of resistor 52, and the and the magnitude of capacitor 51. Preferably resistance or capacitance are adjustable. Pulse T1 is transmitted as an input to accidental coincidence indicating AND Gate means 13'.

Meanwhile, the pulse from output $Q_1$ is transmitted to the delayed pulse generating means as an input to AND Gate 33. The trailing edge of the output pulse of the AND Gate 33 actuates the monostable multivibrator M4. Since the pulse from lead $Q_1$ is rather long in duration, a significant pulse delay is introduced at this point. When actuated, the multivibrator M4 reverses the conditions of its output leads $Q_4$ and $\bar{Q}_4$, thereby providing a high or positive pulse condition at $Q_4$. This pulse from $Q_4$ is pulse T2, which may be varied in duration by adjustment of resistor 48 and capacitor 49. The resistor 48 and the capacitor 49 are preferably variable. The value of the constant K in FIG. 1 may therefore be varied by adjustment of the values of resistors 48 and 52 and by adjustment of the capacitors 49 and 51. In the preferred arrangement, changes in K are made by adjusting resistor 48 and capacitor 49, thereby altering the duration of the pulses T2. From an analysis of the factors involved, K may be computed as being equal to the quantity:

$$2 To/T1 + T2 \times 100\%$$

where To is the resolving time of the coincidence detector 4.

From any given output from OR-ing means 17, the pulse T1 occurs long in advance of the pulse T2, so that these two pulses produced from the same photomultiplier discharge will never coincide in time. However, it is entirely possible that a subsequent photomultiplier discharge has occurred and a subsequent output from summing means 17 has been produced. If the timing of this subsequent discharge is such that the subsequent pulse T1 produced at AND Gate 36 coincides in time with the previously initiated pulse T2 at lead $Q_4$, then both of these pulses T1 and T2 will act as inputs to the accidental coincidence indicating AND Gate means 13'. The probability that pulses T1 and T2 will coincide in time in this way is directly proportional to the probability that a detected coincidence is due to phosphorescence in the liquid sample or accidentally coincident spurious discharges from photomultiplier tubes PM1 and PM2, as has previously been explained. Because pulses both from PM1 and PM2 are received by OR-ing means 17, twice the pulse rate of one photomultiplying tube is generated by OR-ing means 17. Furthermore, two pulses are generated at $Q_1$ for each pulse received at OR-ing means 17, so that the pulse rate at AND gate 13' is four times the pulse rate from a single photomultiplier tube. The other inputs to AND Gate 13' are normally high or positive as long as the four bit reversible binary up-down counter 14 has not been forced beyond its upper or lower limit. Counter 14 has opposing inputs from AND Gate 13' and coincidence detector 4. Counter 14 is necessary to the system to perform an averaging function so that statistical deviations in the accidental coincidence rate as generated on the basis of probability are not allowed to disable or re-enable the coincidence counter 6. Rather, definite trends in the accidental count rate must appear in order to effect such a change. When the counter 14 is in an intermediate condition, coincidence between any portions of pulses T1 and T2 will cause an output pulse from AND Gate 13'. This will increase the stored count in counter 14 by one unit. If the accidental coincidence rate is excessive, the count stored in the counter 14 will increase until all of the output leads of counter 14 carry a charge. These charges will operate AND Gate 40 to produce an output signal which is inverted. This inverted signal places the upper limit output lead 46 in a "low" condition. This low condition of lead 46 prevents further outputs from AND Gate 13' and operates a second flip-flop circuit comprised of interconnected AND Gates 44 and 45. Circuit 46 is connected to the "set" lead of this second flip-flop circuit while circuit 47 is connected to the "reset" lead. When this second flip-flop circuit is operated, the output of AND Gate 45 which is normally high, switches to a low condition. This low condition indicates excessive accidental coincidences, and provides a disabling signal to coincidence counter 6 by way of lead 19. The output from AND Gate 45 remains low until the binary counter 14 registers an excess of coincidences. This occurs when a sufficient number of coincident counts (16 in the case of binary counter 14) are registered in counter 14 to cause counter 14 to spill over its lower limit. When this occurs, outputs are generated by AND Gates 41, 42, and 43. The output of AND Gate 43 is inverted and resets the second flip-flop circuit, causing the circuit condition of lower limit output lead 47 to go low from the previous high condition caused by the output from AND Gate 40. When lead 47 goes low, the gating signal is removed from AND Gate 27 so that pulses representing total coincidences are no longer transmitted directly to the counter 14. Also, the lead 70 goes high so that a current is fed back through resistor 71 to multivibrator M4. The pulse duration generated by multivibrator M4 is thereby changed so that the probability of coincidence is lowered. This prevents the second flip-flop circuit from being trapped in an oscillating cycle. This latter effect is termed placing "hysteresis" into the loop between multivibrator M4 and counter 14.

During the time that the lead 47 is in the high condition, coincidences detected at coincidence counter 4 result in pulses through OR Gate 8, through AND Gate 27, to counter 14. Each time such a pulse is processed, the stored count in counter 14 is reduced by one.

Because a minimum accidental coincidece rate must be allowed for very low activity samples, there is provided a background timer 9 comprised of a programable unijunction transistor 24, and the circuitry associated therewith, connected to counter 14. A voltage source 22 provides an input to programable unijunction transistor 24. There is no signal produced on lead 25 until a sufficient charge is built up in capacitor 23, at which time transistor 24 discharges and a pulse is transmitted on lead 25 to OR Gate 8. Periodic pulses are thereby transmitted to the AND Gate 27, and decrease the stored count in counter 14 when a disabling signal is present on lead 19. This has the same effect as allowing a minimum accidental coincidence rate in the system such as the rate B in FIG. 1, independent of the number of coincidences received by coincidence counter 4. This minimum rate B may be altered by varying the value of resistor 54 which varies the interval of pulsing from transistor 24.

The embodiments of the invention depicted herein have been given for purposes of illustration only, and other alternative and modified forms of the invention will be obvious to those skilled in the art of liquid scintillation counting. Accordingly, the illustrated embodiments should not be considered limiting to the scope of this invention, as this invention is intended to include within its scope the computation of accidentally coincident pulses on the basis of the statistical probability of occurrence of such pulses, and the responsive control of total coincidence counting. For example, the means for determining the number of accidentally coincident discharges from said photodetectors can be performed digitally, as well as in the analog fashion illustrated. The same is true of many of the other analog components illustrated in the drawings.

I claim:

1. In a liquid scintillation coincidence detection device utilizing a coincidence counter and a plurality of photodetectors connected in combinations of two, the improvement comprising: means for determining the number of accidentally coincident discharges from said photodetectors on a statistical basis; means for determining the number of total actual coincident discharges from said photodetectors; means for determining an allowable limit of accidentally coincident discharges; and means for preventing recordation of coincident discharges in said coincidence counter when the number of accidentally coincident discharges exceeds said allowable limit.

2. The apparatus of claim 1 further comprising means for determining said allowable limit as a linear function of total coincident discharges from said photodetectors.

3. The liquid scintillation coincidence detection device of claim 1 wherein said means for determining the number of accidentally coincident discharges further comprises:
   a. pulse delay means actuated by said photodetectors, where said pulse delay means has an AND gate having one input ultimately connected to said photodetectors and the other input connected through an R-C network and a voltage inverter ultimately to said photodetectors,
   b. a coincidence detector connected to said photodetectors,
   c. flip-flop circuit means actuated by said delay means with a disabling lead connected from said coincidence detector.
   d. a delayed pulse generating means having an AND gate input connected to an output of said flip-flop circuit means and to said photodetectors and having a reset lead to said flip-flop circuit means,
   e. accidental coincidence indicating AND gate means connected to an output of said delayed pulse generating means,
   f. a connecting lead with undelayed pulse generating means therein connected between said output of said flip-flop circuit and said accidental coincidence indicating AND gate means in parallel with said delayed pulse generating means,
   g. a second flip-flop circuit means,
   h. a reversible digital counter having an upper limit output signal lead and a lower limit output signal lead and having an input from said accidental coincidence indicating AND gate means and an opposing input from said coincidence detector, and said upper limit output signal lead is connected to a set lead of said second flip-flop circuit means, and said lower limit output signal lead is connected to a reset lead of said second flip-flop circuit, and said second flip-flop circuit has a disabling lead to said coincidence counter, whereby said coincidence counter is disabled when said second flip-flop circuit means is in the set condition and enabled when said second flip-flop circuit is in the reset condition.

4. The liquid scintillation coincidence detecting device of claim 3 wherein a programable unijunction transistor is also connected to said digital counter as an opposing input, whereby there is also a predetermined minimum allowable limit of accidentally coincident discharges independent of the rate of total actual coincident discharges from said photodetectors.

5. In a coincidence counting liquid scintillation detector utilizing a coincidence counter and a plurality of photodetectors connected in combinations of two, the improvement comprising: means for determining the rate of total coincident discharges by said photodetectors; means for determining the rate of occurrence of anticoincident discharges in one of said photodetectors as a percentage of said rate of total coincident discharges; means for comparing said percentage to a percentage limit; and means for preventing recordation of coincident discharges in said coincidence counter when the aforesaid percentage exceeds said percentage limit, thereby placing an upper limit on the number of accidentally coincident discharges recorded.

6. In a liquid scintillation coincidence detector utilizing a coincidence counter and a plurality of photodetectors connected in combinations of two, the improvement comprising: means for determining the rate of occurrence of anticoincident pulses generated by at least one of said photodetectors; means for comparing said rate of occurrence to an upper limit; and means for disabling said coincidence counter when said rate of occurrence of anticoincident pulses exceeds said upper limit, thereby preventing inflation of recorded count rate resulting from excessive accidentally coincident discharges from said photodetectors.

7. The apparatus of claim 6 further comprising means for determining said percentage limit as a root function of total coincident discharges from said photodetectors.

8. The apparatus of claim 6 further comprising reset means for resetting said means for disabling when said rate of occurrence of anticoincident pulses ceases to exceed said upper limit.

9. The apparatus of claim 8 further comprising a gating mechanism for adjusting the number of tabulated coincident discharges recorded in said coincidence counter connected to said means for determining the rate of occurrence of anti-coincident pulses, whereby the number of accidentally coincident discharges is subtracted from the number of total coincident discharges to be recorded in said coincidence counter.

* * * * *

UNITED STATES PATENT OFFICE
CERTIFICATE OF CORRECTION

Patent No. 3,772,512  Dated Nov. 13, 1973

Inventor(s) Barton H. Laney

It is certified that error appears in the above-identified patent and that said Letters Patent are hereby corrected as shown below:

Column 2, line 45, the formula

"$A = 2S_1 Sxhd\ 2t$" should read:

-- $A = 2S_1 S_2 t$ --.

Signed and sealed this 17th day of December 1974.

(SEAL)
Attest:

McCOY M. GIBSON JR.
Attesting Officer

C. MARSHALL DANN
Commissioner of Patents